US012628799B2

(12) United States Patent (10) Patent No.: US 12,628,799 B2
Anantaraman et al. (45) Date of Patent: May 19, 2026

(54) APPARATUS CAPABLE OF PROTECTING FEET OF AN ANIMAL FROM DANGEROUS TEMPERATURE AND METHOD OF CONTROLLING SAME

(71) Applicants: Aditya Anantaraman, Folsom, CA (US); Vansh Angi, Folsom, CA (US); Joseph Castillo, Sacramento, CA (US); Kushal Chebiyam, Folsom, CA (US); Siddhartha Dey, Sacramento, CA (US); Leo Guo, Folsom, CA (US); Jeeva Karthy, Rancho Cordova, CA (US); Tanisha Lakhanpal, West Sacramento, CA (US); Sureena Lakhanpal, West Sacramento, CA (US); Ai-Vy Le, Elk Grove, CA (US); Candice Li, Sacramento, CA (US); Aniruddh Mohan, Sacramento, CA (US); Noramon Ransibrahmanakul, El Dorado Hills, CA (US); Rylan Rubiono, Sacramento, CA (US); Reva Sharma, El Dorado Hills, CA (US); Shreya Srikanth, El Dorado Hills, CA (US); Hari Srikanth, El Dorado Hills, CA (US); Srivishal Sudharsan, Sacramento, CA (US); Showmen Talukder, Sacramento, CA (US); Franco Canet, Rocklin, CA (US); Colleen Kelly, Placerville, CA (US)

(72) Inventors: Aditya Anantaraman, Folsom, CA (US); Vansh Angi, Folsom, CA (US); Joseph Castillo, Sacramento, CA (US); Kushal Chebiyam, Folsom, CA (US); Siddhartha Dey, Sacramento, CA (US); Leo Guo, Folsom, CA (US); Jeeva Karthy, Rancho Cordova, CA (US); Tanisha Lakhanpal, West Sacramento, CA (US); Sureena Lakhanpal, West Sacramento, CA (US); Ai-Vy Le, Elk Grove, CA (US); Candice Li, Sacramento, CA (US); Aniruddh Mohan, Sacramento, CA (US); Noramon Ransibrahmanakul, El Dorado Hills, CA (US); Rylan Rubiono, Sacramento, CA (US); Reva Sharma, El Dorado Hills, CA (US); Shreya Srikanth, El Dorado Hills, CA (US); Hari Srikanth, El Dorado Hills, CA (US); Srivishal Sudharsan, Sacramento, CA (US); Showmen Talukder, Sacramento, CA (US);

Franco Canet, Rocklin, CA (US);
Colleen Kelly, Placerville, CA (US)

( * ) Notice: Subject to any disclaimer, the term of this patent is extended or adjusted under 35 U.S.C. 154(b) by 0 days.

(21) Appl. No.: 18/740,043

(22) Filed: Jun. 11, 2024

(65) Prior Publication Data

US 2024/0423167 A1 Dec. 26, 2024

Related U.S. Application Data

(60) Provisional application No. 63/509,633, filed on Jun. 22, 2023.

(51) Int. Cl.
*A01K 29/00* (2006.01)
*A01K 13/00* (2006.01)
(Continued)

(52) U.S. Cl.
CPC .......... *A01K 27/006* (2013.01); *A01K 29/005* (2013.01); *A01K 27/001* (2013.01);
(Continued)

(58) Field of Classification Search
CPC .. A01K 29/005; A01K 29/007; A01K 13/007; A01K 27/001; A01K 27/009
See application file for complete search history.

(56) References Cited

U.S. PATENT DOCUMENTS 7,420,473 B2 * 9/2008 Eicken ............... G08B 21/0202
340/573.3
9,652,975 B1 * 5/2017 Riley ........................ G08B 1/08
(Continued)

FOREIGN PATENT DOCUMENTS

DE 102023203348 A1 * 10/2024 ............... A01L 7/00
DE 202024001854 U1 * 1/2025 ............. A01K 35/00
(Continued)

*Primary Examiner* — Kristen C Hayes
(74) *Attorney, Agent, or Firm* — Cowan, Liebowitz & Latman, P.C.; Mark Montague; Fei Xing

(57) ABSTRACT

An attachable apparatus that employs a battery-powered internal infrared thermometer to detect the ground tempera-
(Continued)

ture below an animal's paws at regular intervals. The apparatus comprises a housing that houses a microcontroller, an infrared thermometer, a battery, an internal wiring, an on/off switch, and a port for charging. Said housing is securely attachable to an animal's gear by interlocking with an attachment system. The apparatus is compact, and designed so that the infrared thermometer is angled downwards and unobstructed to ensure consistent ground temperature detection. The detection results can be output to an external device, for example, a user' phone. If the ground is determined to be above a certain dangerous temperature threshold, the apparatus alerts the animal's owner. Temperature data can also be uploaded to a server, so that other users in the area can view a virtual heatmap that displays regions of dangerous ground temperature.

18 Claims, 13 Drawing Sheets

(51) Int. Cl.
*A01K 27/00* (2006.01)
*G01J 5/10* (2006.01)

(52) U.S. Cl.
CPC .......... *A01K 27/002* (2013.01); *A01K 27/009* (2013.01); *G01J 5/10* (2013.01)

(56) References Cited

U.S. PATENT DOCUMENTS

| | | | | |
|---|---|---|---|---|
| 10,002,515 | B2 * | 6/2018 | de Barros Chapiewski ................ | G08B 13/2462 |
| 10,498,397 | B1 * | 12/2019 | Nackaerts ................ | H04B 5/22 |
| 10,687,514 | B2 * | 6/2020 | Sheldon ............... | A01K 29/005 |
| 2007/0095304 | A1 * | 5/2007 | Rosenberg ............ | A01K 29/00 119/720 |
| 2014/0275824 | A1 * | 9/2014 | Couse .................... | G16H 40/60 600/301 |
| 2018/0064068 | A1 * | 3/2018 | McKee ................. | H04W 4/023 |
| 2024/0196863 | A1 * | 6/2024 | Wernimont .......... | A01K 27/001 |
| 2024/0251758 | A1 * | 8/2024 | Fukada .................. | A01K 11/00 |

FOREIGN PATENT DOCUMENTS

| | | | | | | |
|---|---|---|---|---|---|---|
| KR | 2019061772 | A | * | 6/2019 | | |
| KR | 20230166585 | A | * | 12/2023 | ............... | A61B 5/01 |
| WO | WO-2015054308 | A1 | * | 4/2015 | ........... | A01K 27/001 |

* cited by examiner

50

52

54

74

70

62

APPARATUS CAPABLE OF PROTECTING FEET OF AN ANIMAL FROM DANGEROUS TEMPERATURE AND METHOD OF CONTROLLING SAME

REFERENCE TO RELATED APPLICATION

This application claims priority to U.S. provisional patent application No. 63/509,633, filed on Jun. 22, 2023, which is incorporated herein by reference in its entirety.

FIELD OF THE INVENTION

The present invention relates generally to pet safety equipment and more specifically, it relates to devices that can be worn by pets in order to ensure the protection of their feet from dangerous temperatures.

BACKGROUND OF THE INVENTION

On the bottom of a dog's foot are pads made up of fatty tissue, elastic fibers, and thick skin. The pads cushion dogs' feet as they move around during the day in order to reduce the pressure on their legs-much like the soles on human shoes. However, when a dog, or even a cat, walks on hot surfaces, these sensitive pads can easily be injured. Heating-susceptible surfaces such as pavement and artificial grass can cause blisters and burns. During times of hot weather, these burns are a common and possibly serious issue.

Most people would assume that pet owners can tell when the pavement is too hot for their dog's paws, but it is actually challenging to notice details like that, especially when someone is only thinking about giving their pet exercise. People wear shoes and clothes, which makes heat on the ground harder for us to detect. However, dogs, with their sensitive paws, have to walk on hot surfaces barefoot. Dogs do not do well wearing shoes or socks, because it is uncomfortable for them, and their whining usually makes their owners yield and not make them wear the protective gear. Additionally, dogs do not always communicate well when they are in pain or overheating. This makes it difficult for owners to realize that their dogs' paws may be under stress.

Perhaps even more importantly, people do not understand that the temperature of surfaces like pavement can be much higher than the air temperature. Owners are almost never in direct contact with the ground that the dog is walking on, so they often do not realize the temperature difference. Because of how fast the temperatures of asphalt, concrete, sand, and cement rise, ground made out of these materials quickly becomes a high temperature environment. On a day with a temperature of 77° F. (25° C.), the temperature of asphalt has been recorded as high as 125° F. (52° C.), while on an 87° F. (30.5° C.) day, the temperature of asphalt has been recorded as high as 143° F. (62° C.). Statistically, concrete can be anywhere from 10 to 15° F. warmer than the average surface. This is problematic because it only takes sixty seconds on pavement at a temperature of 125° F. (52° C.) for a dog's pads to burn. For example, Powell, Charlie. (2017), Protect your pet's feet from heat, burns. WSU Insider, the disclosures of which are incorporated herein by reference. Naturally, because dog owners are paying attention to many other factors during walks, they are not always thinking about their dogs' paws, so there has to be some way for owners to be alerted of dangerous conditions like these. The object of the present invention is to actively monitor the ground for dangerous conditions and serve as an alert mechanism to pet owners. Despite the problem being primarily related to dogs, the present invention aims to solve this problem for any domestic animal that people might walk outdoors.

Currently, there is no prior art that aims to read ground temperature and alert pet owners if it is too hot for their pet's paws. Some similar prior arts are attachments to a dog's collar that keep track of information like location or the dog's vital signs, but our presented invention is unique since it is an attachment with ground temperature reading functionality.

OBJECTS AND SUMMARY OF THE INVENTION

In view of the foregoing, it is an object of the present invention to provide an animal protection apparatus for protection for feet of an animal, designated to be easily attached and detached from the animal's body. By detecting ground temperature changes in real-time, it promptly alerts animal owners to potentially hazardous conditions, thereby preventing injuries to the feet of the animal.

To achieve the foregoing, the following are brief summaries of embodiments of the present invention and various aspects/features thereof.

In accordance with certain embodiments of the present invention, the animal protection apparatus comprises a main housing containing a temperature sensor for detecting the ground temperature beneath the animal. Additionally, the apparatus includes a controller for generating warning signals based on the ground temperature detected by the sensor, a power supply that provides power to both the temperature sensor and an attachment system for securely and detachably affixing the main housing to the animal's gear worn by the animal.

In such embodiment, the temperature sensor consistently points towards the ground when the apparatus is attached to the animal's gear through the attachment system. This allows for the detection of ground temperature regardless of the animal's posture.

As other aspects of the invention, the temperature sensor is an infrared (IR) sensor capable of emitting and receiving infrared radiation to detect the temperature of an object. The gear can be a collar, a harness, a vest, or clothes that the animal can wear.

As further aspect of the invention, the attachment system of the apparatus comprises a clamp and an attachment component. The clamp is removably attachable to the animal gear and the attachment component consists of a first end and a second end. The first end is designed to be attachable to the clamp and capable of sliding with respect to it and the second end is connectable to the main housing, allowing the main housing to pivot with respect to the animal's body when the apparatus is attached.

In such embodiment, the first end of the attachment component is a slot piece, designed to slide and fit within a sliding channel located on the front piece of the clamp. The second end of the attachment component is a cylinder, intended to slide into and be rotatably connected to a cylinder channel protruding from the main housing. Additionally, the slot piece is equipped with one or more magnets to secure the attachment component to the clamp through magnetic force.

As yet another aspect of the invention, the protective box further comprises a sensor channel, which is a cylindrical recess where the temperature sensor is housed and recessed within the protective box.

As yet another aspect of the invention, the power supply is a rechargeable battery, with a charging port and a power switch connected to it. Both the charging port and the power switch are accessible externally from the main housing, through openings of the main housing.

Additionally, the apparatus includes a communication interface for establishing a connection between the apparatus and an external device, enabling the output of the warning signal to the external device.

In such embodiment, the connection between the apparatus and the external device is a short range wireless connection, such as Wi-Fi® and/or Bluetooth® protocols. Moreover, the apparatus includes a location detector for detecting the animal's location, and this detected location is transmitted to the external device via the communication interface.

In accordance with other embodiments of the present invention, the apparatus comprises a housing containing a temperature sensor for detecting the ground temperature beneath the animal, as well as a processor and memory coupled to the processor. The memory stores instructions that cause the processor to perform the following operations: receiving an output from the temperature sensor to identify the ground temperature, comparing the identified ground temperature with a predetermined temperature threshold, for example, 50° C., generating a warning signal if the ground temperature exceeds the predetermined threshold, and outputting the generated warning signal.

In such embodiments, the apparatus detects the temperature of ground, by the temperature sensor, at a predetermined time interval, for example, every fifteen seconds.

As an aspect of the invention, a calibration process is performed for calibrating the temperature sensor. The process comprises positioning the apparatus on a surface with a known and controlled ground temperature, detecting a temperature of ground from the surface on which the apparatus is positioned using the temperature sensor. The process further comprises comparing the difference between the known and controlled ground temperature and the temperature detected by the temperature sensor and adjusting the output of the temperature sensor based on the comparison.

As another aspect of the invention, the warning signal is output to a user by playing a sound or by illuminating an LED (Light Emitting Diode) light As further aspect of the invention, the detected temperature is transmitted to a server, in order to create a GPS® heatmap that shows dangerous areas in the heatmap.

In accordance with yet other embodiments of the present invention, a method for protecting an animal's feet is provided. First, a predetermined temperature threshold is set in an apparatus containing a temperature sensor. After the apparatus is attached to the animal's body, the temperature sensor is adjusted to point towards the ground by rotating its angle with respect to the ground. Subsequently, the temperature sensor's output is received to identify the ground temperature. This identified temperature is then compared with the predetermined threshold. If the ground temperature exceeds the threshold, a warning signal is generated and outputted, alerting the user that the ground temperature poses a threat to the feet of the animal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

A. Overview

Figure 1:
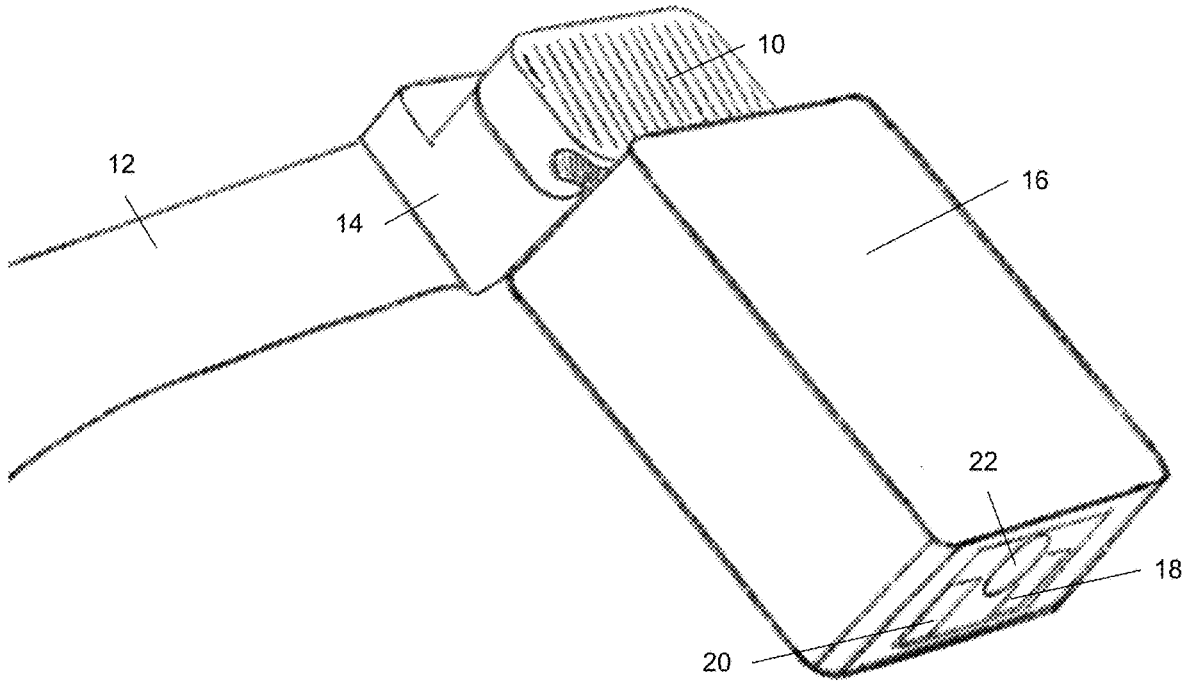
FIG. 1 is an illustrative body diagram of the present invention.

The invention is a removable attachment to pet collars that alerts pet owners if the ground temperature poses a threat to the pads on the bottom of their pet's paws. It utilizes an infrared (IR) temperature sensor to read the temperature of the ground at regular intervals from a distance. The main housing of the device contains all of the electrical components, including the sensor, and protects them from impact, water, and any other compounds that could disturb the function of the device. The housing is built in a layered manner, which holds internal pieces securely. The housing is then attached to a pet's collar at the neck through a two-piece clamp and slide attachment system and oriented such that the infrared sensor is unobstructed and pointed at the ground in front of the animal. A processing unit within the invention uses the infrared temperature sensor to obtain a ground temperature reading every fifteen seconds. This reading is then sent to the user's phone through a wireless connection, and if the phone calculates that the reading is above a danger threshold, it will send an alert to the user in the form of a notification, telling the user that they should move immediately to a safer region. The temperature readings are also sent to a server which compiles the readings taken from other nearby users to create a GPS® heatmap that can show a user dangerous areas in their vicinity. The device is powered by an internal battery, which can be recharged with an external cable when the user returns from walking their pet and removes the device from the pet's collar.

B. Temperature Measurement Sensing Apparatus

The invention utilizes an infrared temperature sensor 44 that is cylindrical in shape and pointed towards the ground to read ground temperature. The specific sensor that is used is variable, and this embodiment of the invention uses an IR sensor from Melexis® Technologies, but it must be compact enough to fit within the housing and rest securely within the sensor channel 42. The sensor channel is a cylindrical recession within the protective box 52 that is angled such that the opening of the channel 22 is pointed towards the ground directly in front of the animal. This is a requirement for the infrared temperature sensor 44 because it operates by emitting and receiving beams of infrared radiation, then focusing that energy into a thermopile and calculating the temperature. Thus, the sensor must be angled in order to see the ground and read temperature regardless of the posture of the animal and it must be recessed within the protective box 52 so that it is unobscured and out of harm's way. The infrared temperature sensor 44 is connected to the micro-controller 40 by way of wiring 76. The microcontroller 40 is any processing unit capable of performing simple calcula-tions, receiving and processing data at time intervals, and providing power to the temperature sensor 44. The wiring 76 is any standard circuitry wires or cables that can consistently connect and carry information between the microcontroller and the sensor. The wiring connects the IR sensor to the microcontroller at the respective ports, which in this embodiment of the invention, are 5V Out, Serial Clock, Serial Data, and Ground.

C. Device Circuitry

The invention's circuitry relies on the microcontroller 40, which in this embodiment of the invention, is the Arduino Uno® based DFRobot Beetle® BLE. This is variable, and some of the requirements are listed above, but other require-ments include dimensions of around 30 mm×35 mm such that it can fit within the compact device and general struc-tural stability. The internal wiring of the invention is kept straightforward, and in this embodiment, consists entirely of stripped and soldered jumper wires 76, but any effective wires will do. Alongside being wired to the temperature sensor, the microcontroller is wired to the battery 38. The specific battery used is variable, but it must have sufficient capacity to power the device for around one hour of opera-tion and must have dimensions of around 30 mm×45 mm×7 mm to fit within the compact device. In between the micro-controller ground port and the battery is the power switch 46, which is used to regulate the current flow and turn the device on and off. Any power switch that can be wired in between the battery and the microcontroller and is suffi-ciently small is usable for the invention. Finally, the charg-ing port breakout board 48 is wired parallel to the micro-controller after the battery. It is wired this way to allow charging of the device and operation simultaneously. Any charging port that will fit within the invention and allows for the connection of an external power source in order to charge the onboard battery is sufficient. As for the writing, the battery's positive wire splits to connect the charging port breakout board positive terminal and the microcontroller voltage-in port, while the ground wire splits to the breakout board ground terminal and the switch, which is in turn wired to the microcontroller ground. This is simply an example of the circuit technology used in our device, but any standard circuitry that fulfills the requirements of a battery-powered, rechargeable device that reads, processes, and transmits infrared thermometer data within a compact device is suf-ficient.

D. Device Housing

The device's housing is designed in order to protect the core electrical components of the device while maintaining clear organization, ensuring structural integrity, and being non-dangerous to the pet that is wearing the invention. As illustrated in FIGS. 3-7, all components rest on the base plate

Figure 3:
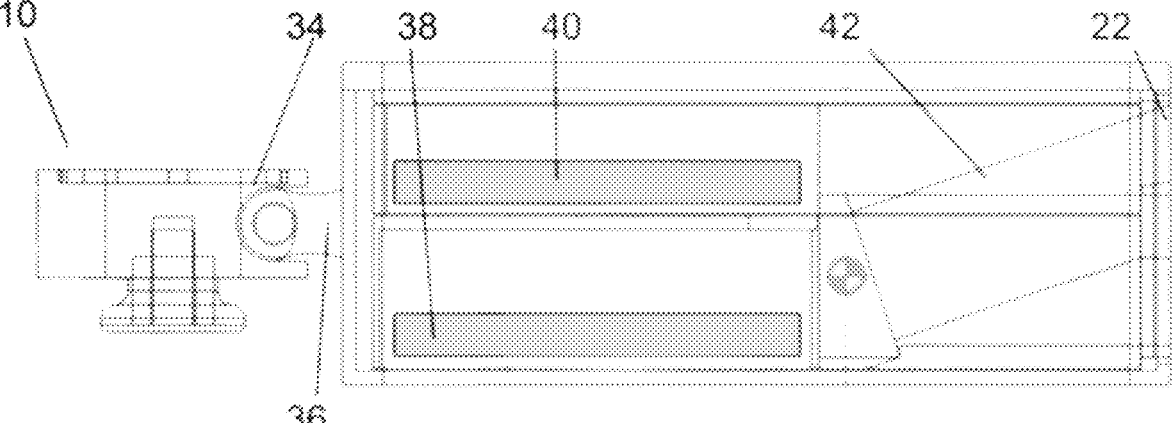
FIG. 3 is a wireframe diagram of the present invention as seen from the side, with internal structures visible.
Figure 4:
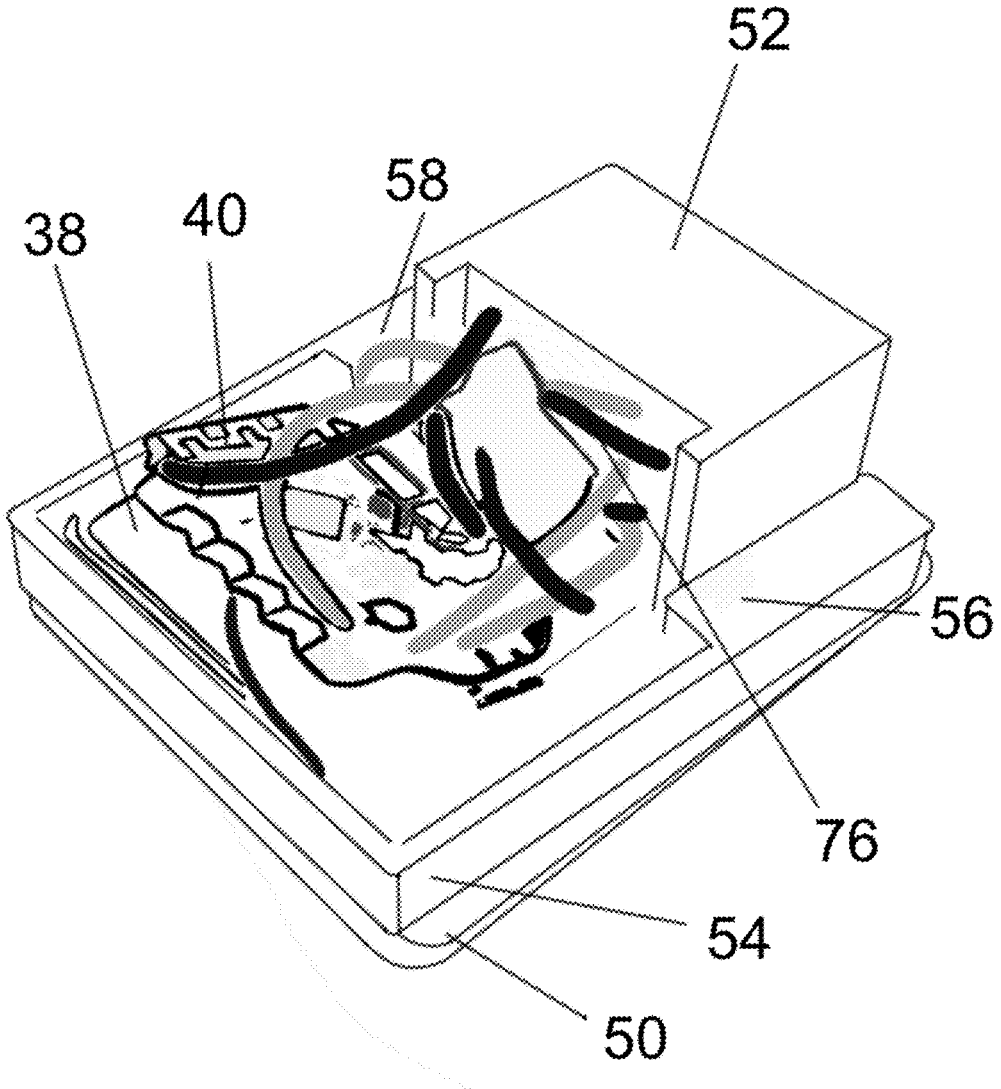
FIG. 4 is a photograph showing internal housing layers removed and internal circuitry visible.
Figure 5:
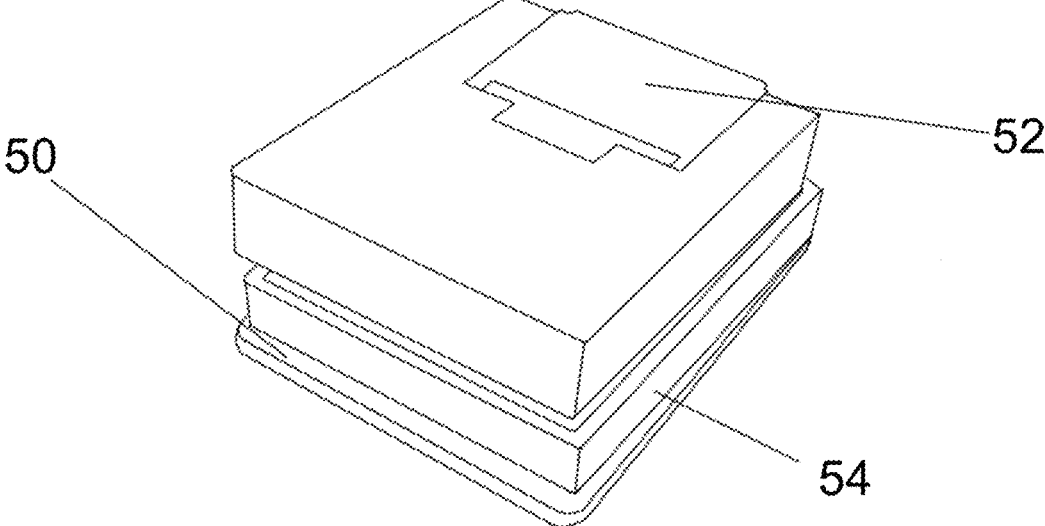
FIG. 5 shows two internal housing layers present and the outer housing layer removed.
Figure 6:
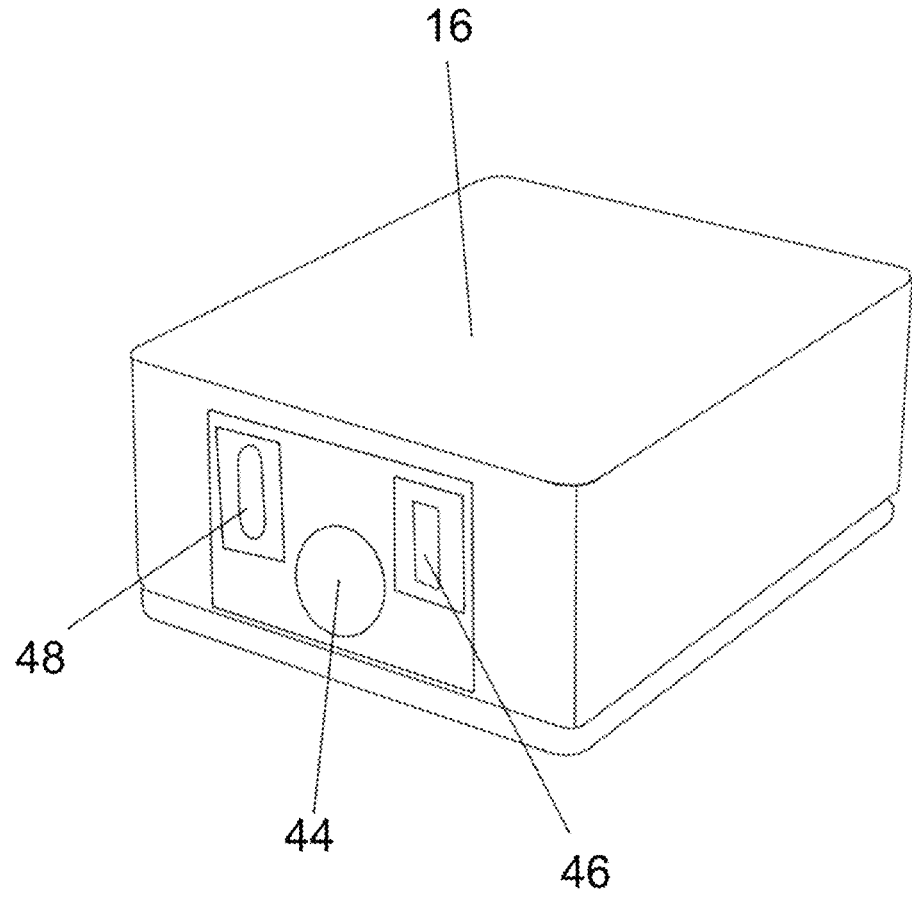
FIG. 6 shows the outer housing layer added on and the bottom of the inventive device visible.
Figure 7:
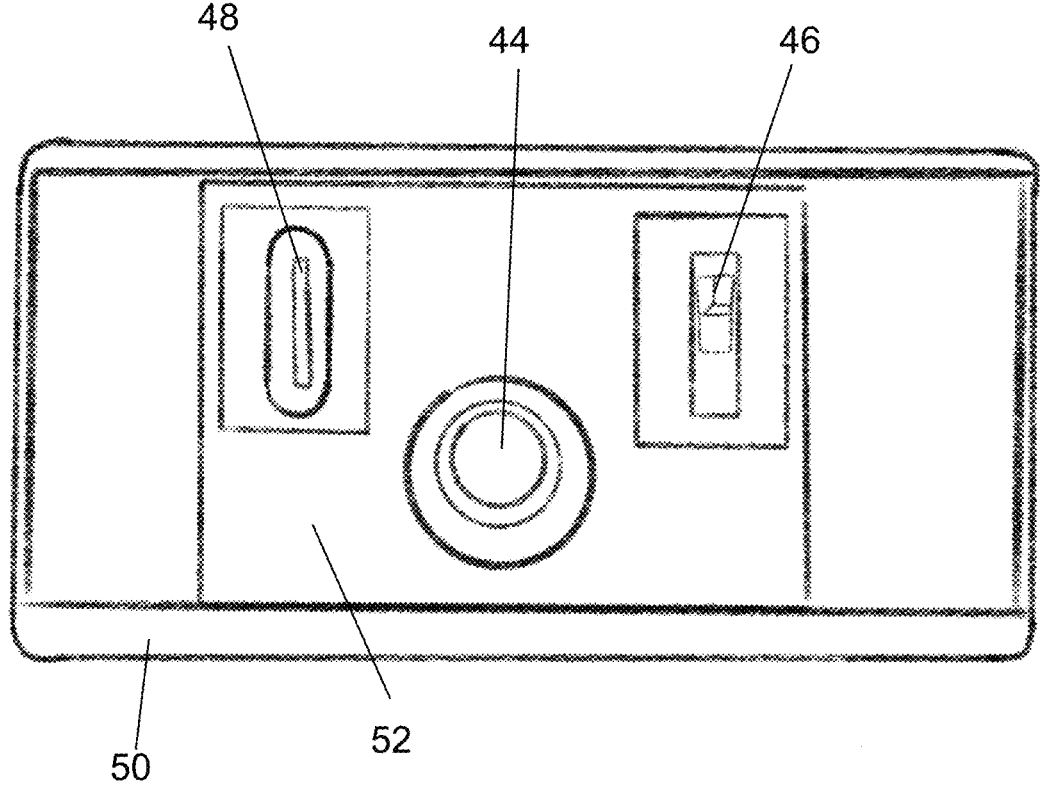
FIG. 7 is the bottom view of the present invention.

50, which the protective box 52 is on top of at the bottom end of the plate. The microcontroller 40 is stacked on top of the battery 38, and both components are then placed on the base plate 50, which is schematically illustrated in FIG. 4. In addition, the infrared temperature sensor 44, the power switch 46, and the charging port breakout board 48 are all slotted into the protective box 52 securely. On the bottom end of protective box 52 are the sensor channel opening 22, the power switch opening 18, and the charging port opening 20 (FIG. 1). The components are exposed to the outside through their respective openings so that the sensor can emit and receive radiation from the outside, so that the power switch is externally accessible by a human user and can be turned on and off, and so that the charging port is externally accessible and can have an external charging cable plugged into it. Since all components are within the protective box and the microcontroller and battery are on the base plate, the wiring 76 is also resting on top of the microcontroller to connect all components effectively. To ensure that the micro-controller and battery do not slide around on the base plate, the first internal housing layer 54 is attached to the base plate 50 and acts as a rectangular border to prevent motion. It has thicker components 56 and 58 at the ends to the left and right of the protective box 52 to cover all the area of the base plate 50, further ensuring sliding and preventing any wiring from getting stuck in the gap area between the protective box and the internal housing layer. The method by which the first internal housing layer 54 is connected to the base plate 50 is variable, and in this embodiment, we used plastic welding, but any adhesive technique that ensures the two pieces do not separate is sufficient. Additionally the shape and thick-ness of the base plate 50 and first internal housing layer 54 are variable, but they must carry out the function of holding electrical components in place without obstructing the physical requirements of the device such as compactness and comfort. On top of the first internal housing layer 54 rests the second internal housing layer 56, which can again be attached to the first layer by means of any sufficient adhesive technique. This layer ensures that the wires 76 are held securely and that the microcontroller 40 does not move away from the stacking configuration it is placed in. As shown in FIG. 5, the second internal housing layer 56 has a recessed portion so that its installation is not obstructed by the breakout board, base of the temperature sensor, and the on/off switch, since these pieces do not fit completely into the protective box. Finally, as shown in FIG. 6, the device outer housing 16 fits over all the internal housing layers, the protective box, and all respective components. It is a rect-angular prism with one missing face and an opening the same shape and size as the protective box at the bottom end such that all areas of the invention are covered except for the openings included within the protective box. As show in FIG. 3, the device main housing 16 also includes a protrud-ing segment 36, which is the width of the middle third of the device and has a cylindrical channel 34, at the top end. The outer housing 16 seals the invention tight by way of plastic welding, but any adhesive technique is sufficient, as long as it ensures the device is watertight and will not come apart during regular use. A clear acrylic coat is also applied to the entire outer housing 16, the outer-facing end of the protec-tive box 52, and the bottom of the base plate 50, both for aesthetic purposes, but also to create a soft surface that does not irritate the pet when the device is worn. However, any method of creating a smooth and comfortable surface will accomplish this task. Although this embodiment of the invention has a housing that takes the shape of a rectangular prism, any shape that is compact enough to prevent disturbance to the pet, can ensure the temperature sensor 44 is pointed towards the ground in an unobstructed fashion, can comfortably hold all other components, and can ensure ease of assembly is sufficient. In a previous embodiment of the device, the housing was more pyramidal in shape, but this created difficulties in assembling the device and including the charging port breakout board, so we adapted the device towards a more rectangular shape. There were other certain shapes that have been demonstrated by our experiments not to work because the sensor would become obstructed by the fur of the pet. Our current embodiment of the invention is large enough to prevent this from happening, since it extends well below the fur can reach.

E. Charging

As illustrated in FIG. 6, by inserting a charging cable (not shown), which is attached to an external power source, into the charging port 48 on the bottom of the device, the battery will slowly be recharged since the charging port breakout board is wired to the battery. This embodiment of the invention takes around two hours to charge when plugged into a home wall outlet. This embodiment also uses USB-C for the charging port breakout board 48, however, this is variable. Any charging port that is sufficiently small, which includes but is not limited to micro-USB and lightning, will accomplish the intended goal. As for physical structure, the charging port is easily accessible to the user when the device is not attached to a collar, and almost all external cables are able to interface with the charging port without damaging the device or exerting unintended pressure on its physical structure.

F. Housing Attachment Component

Figure 2:
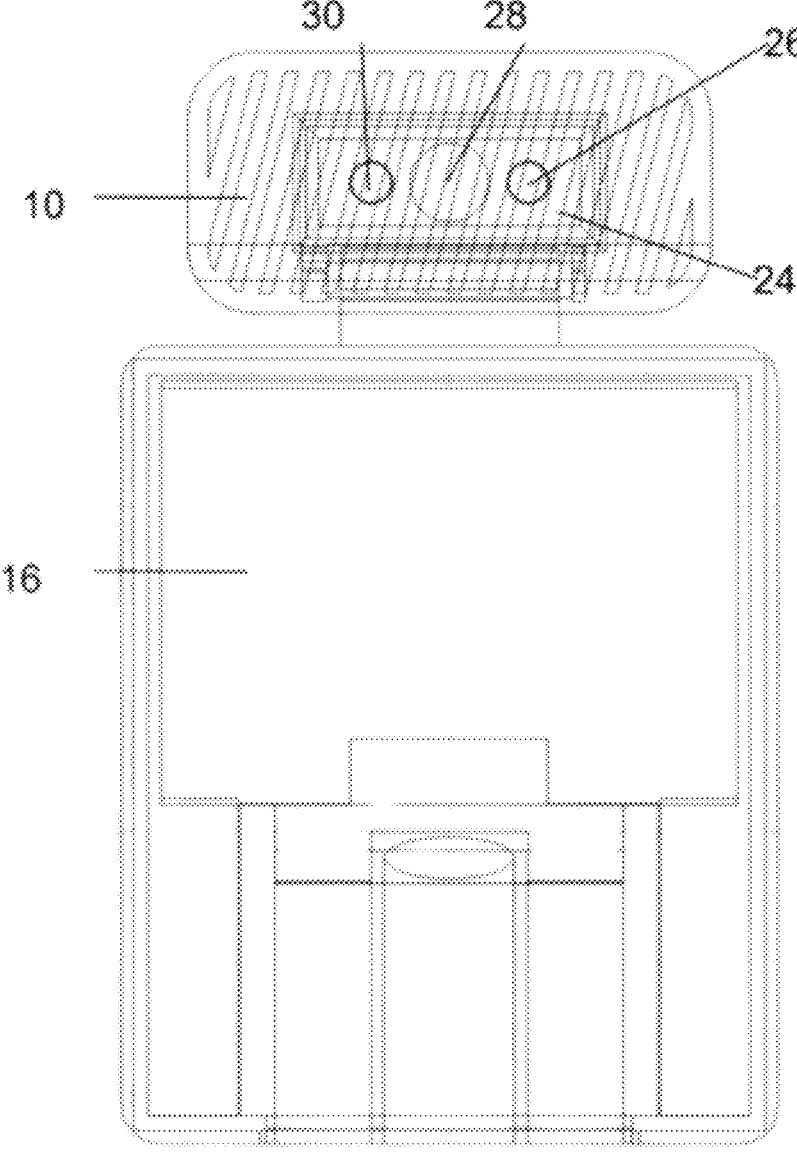
FIG. 2 is a wireframe diagram of the present invention as seen from the front, with layers superimposed on each other and key structures outlined.
Figure 8:
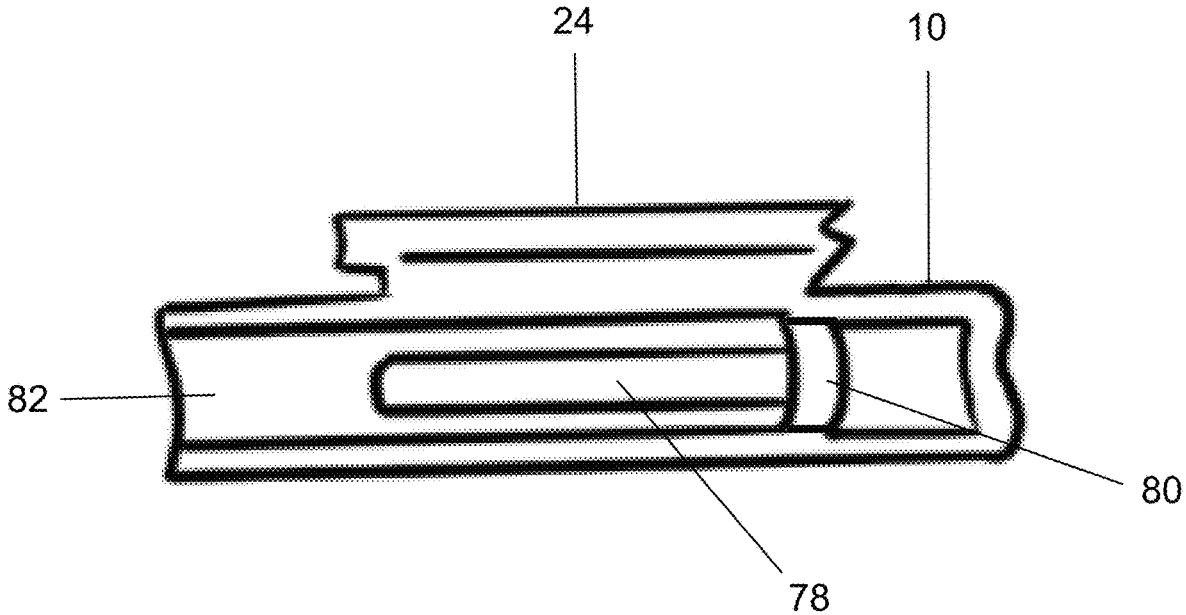
FIG. 8 is the bottom view of the housing attachment component that attaches on the top of the main invention housing.
Figure 9:
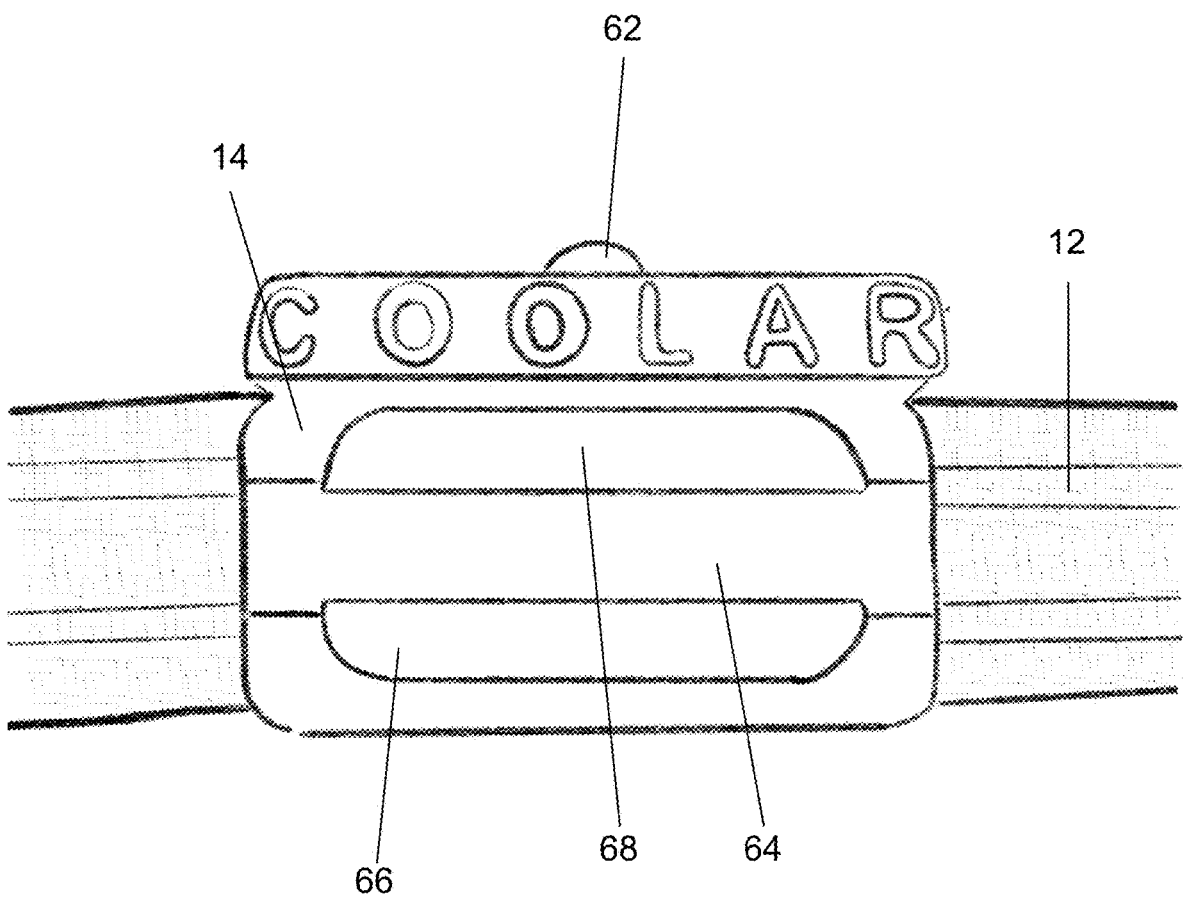
FIG. 9 is the front-facing view of the collar clamp attachment mount.

To connect the invention to a pet's collar so it can be used, it relies on a two-part attachment system, the first of which is the housing attachment component 10. See, FIG. 8. The attachment component has a semi-cylindrical recession 82 at its bottom end, except for a circular disc 80 on one side of the recession and a cylinder 78 that protrudes from the circular disc towards the other end of the recession. The cylinder 78 should leave small gaps between itself and the surfaces of the housing attachment component while also leaving around 1.5 mm of the recession unblocked. As illustrated in FIGS. 3 and 8, this housing attachment component connects to the outer device housing 16 by way of the cylinder 78 sliding into the cylindrical channel 34 of the protruding segment 38. Also, the protruding segment 36 fits snugly into the semi-cylindrical recession 82 such that the two larger components will not become detached from one another but they will still be able to rotate a few degrees in either direction. This rotation is helpful to ensure that the bottom of the main device housing is always pointed directly downwards thanks to the action of gravity. Protruding from the housing attachment component 10 is the slot piece 24, which has magnets 26, 28, and 30 within (illustrated in FIGS. 2 and 8). The slot piece is shaped to slide and fit within a groove and the magnets are included to hold it steady and increase the locking strength with which the device remains attached to a pet's collar.

G. Collar Attachment Clamp

Figure 10:
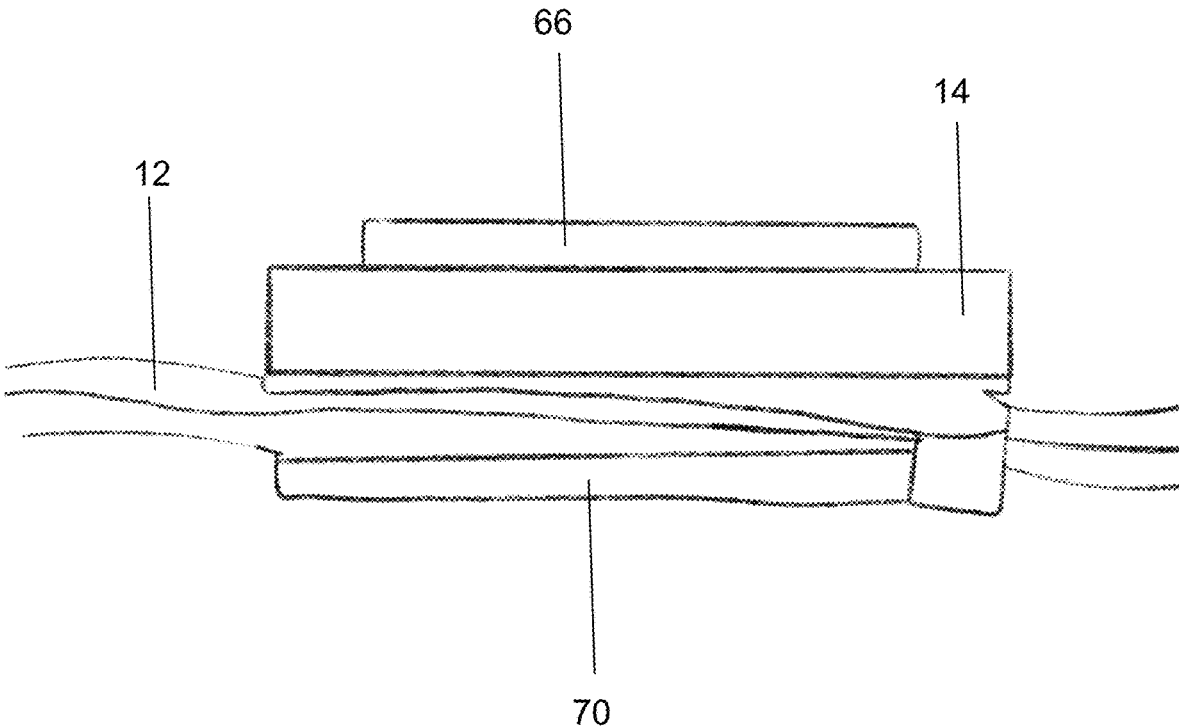
FIG. 10 is the bottom view of the present invention's collar clamp attachment mount.
Figure 11:
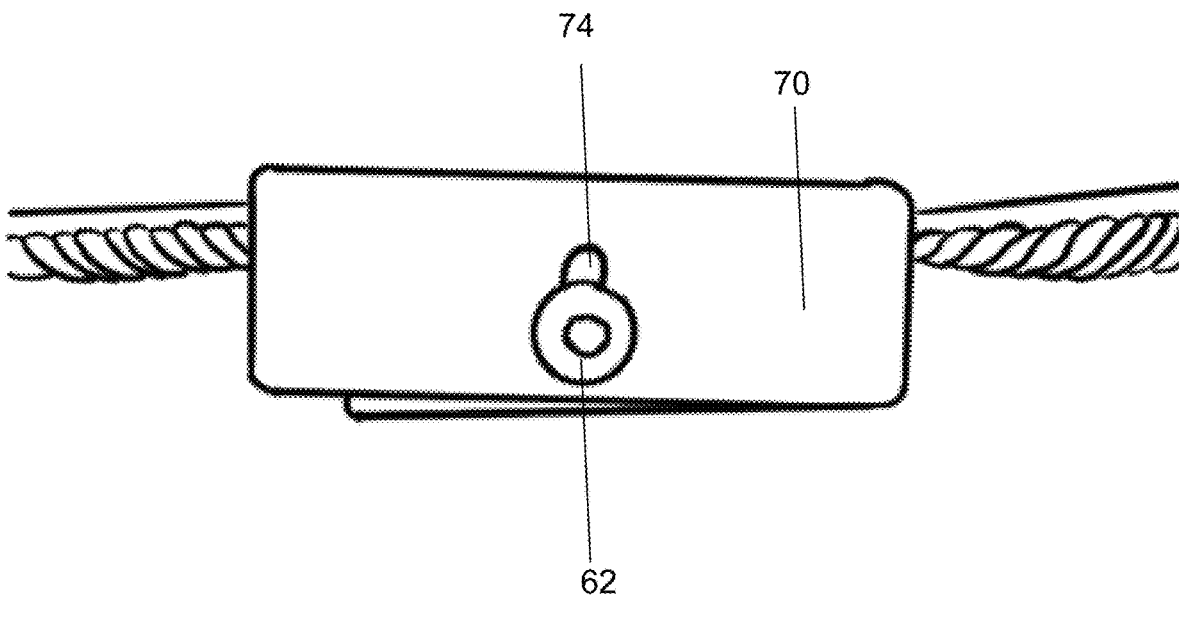
FIG. 11 is the top view of the present invention's collar clamp attachment mount.
Figure 12:
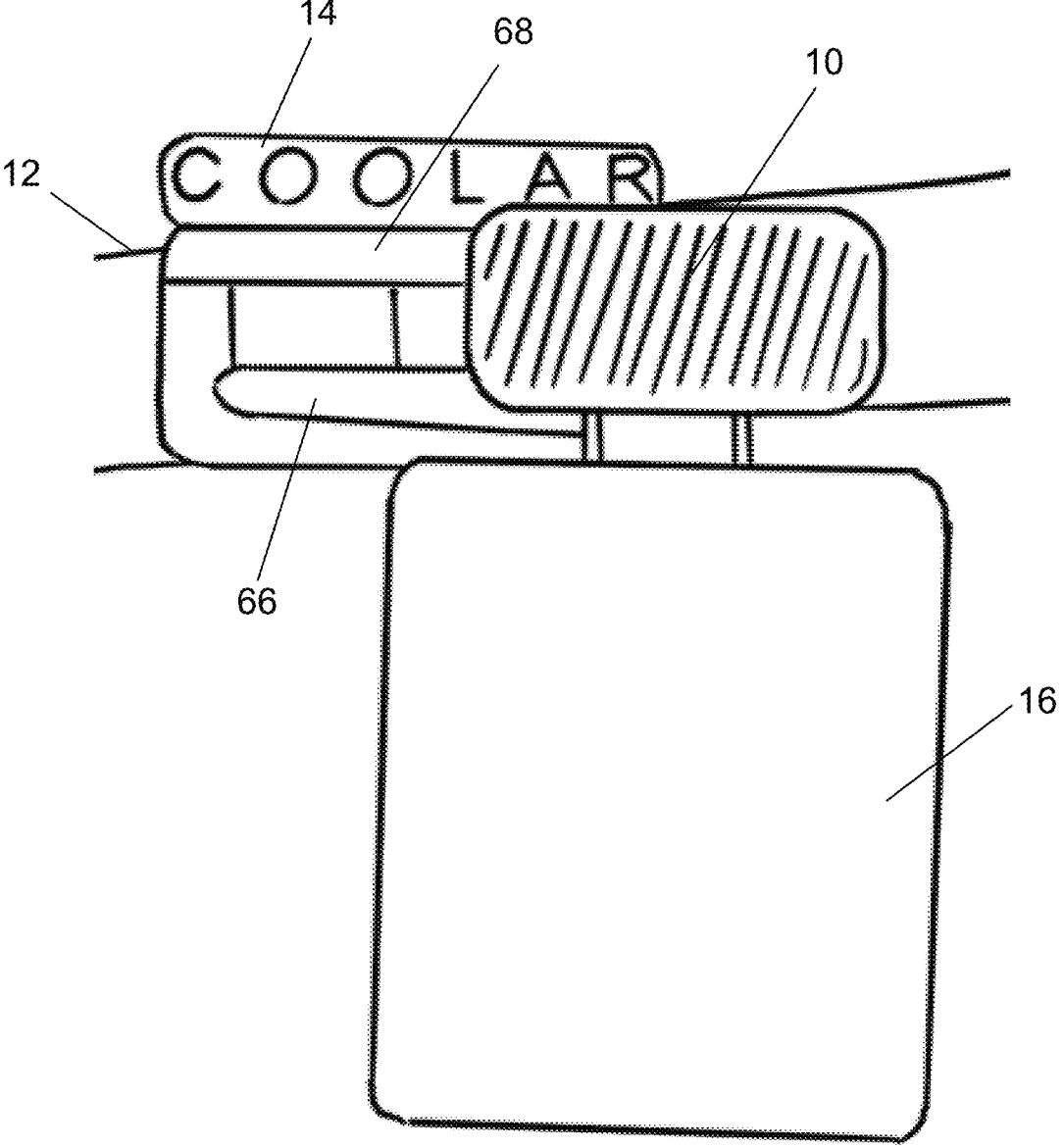
FIG. 12 is the front-facing view of present invention, halfway secured into collar clamp attachment mount.
Figure 13:
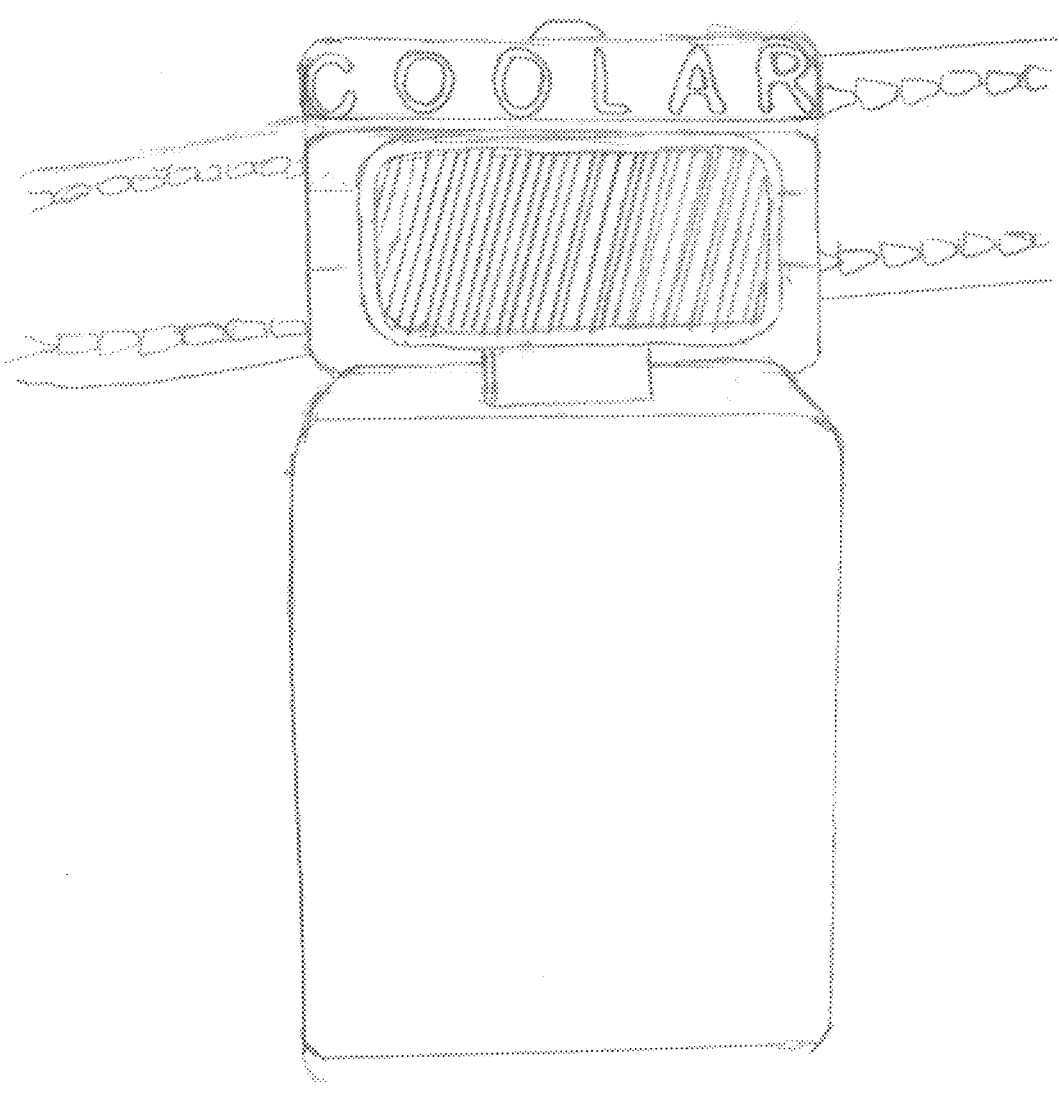
FIG. 13 is the front-facing view of the present invention fully attached to a collar.

Referring to FIG. 10, the second part that allows the invention to be connected to a pet's collar is the collar attachment clamp, which is made of two pieces, the front piece 14 and the back piece 70. The clamp is directly fastened to the pet's collar and is designed such that it can stay fastened indefinitely, even when the device is not in use. The two pieces are attached such that they are hinged, and the collar 12 can slide into the opening that is left behind. As illustrated in FIG. 11, to secure the attachment in place and ensure that it clasps the collar, the assembly is locked by inserting a screw 62 into a 3 mm screw hole 74. The method of locking and the size of the screw hole, if one is used, are variable, but they must succeed at keeping the apparatus attached to the collar. Importantly, a simple and flexible 3 mm screw was used for this embodiment because it is very easy to install and remove, and if a device user ever wants to remove the collar attachment from their pet, they should not have to struggle. The back piece 70 must be thin in order to prevent poking and disturbing the pet. For the front piece 14, the shape and size are variable, but it should ensure comfort. In this embodiment of the device, the front piece to engrave a prototype name is used, simply for decoration. Functionally, on the front piece 14, there are two segments that protrude out towards the front, 66, and 68, which leave a channel 64 for the slot piece 24 of housing attachment component 10 to slide into. There are also magnets embedded within the front piece 14 which create a stronger hold in unison with the magnets of the slot piece. For the main device housing to be attached to the collar, the user will slide the slot piece 24 into the channel 64 from the side until it is locked in place, as shown by FIG. 12 and FIG. 13. The width of channel 64 should ensure that it is compatible with the slot piece and so that it holds it tightly, reducing the chances of the main device housing becoming detached.

H. Mobile Application

Each time the device makes a temperature reading, which is every fifteen seconds in this embodiment, the information is wirelessly sent to a companion application on the user's mobile phone through whatever reasonable method of wireless communication that would be appreciated in the industry. In this embodiment of the device, our microcontroller has Bluetooth® capability, so a Bluetooth® connection with the phone must be established prior to using the device. The device sends multiple packets to the mobile device containing the temperature reading from the infrared sensor. Once the temperature reading is received, the app will check to see if this temperature is above the danger threshold of 50° C. If it is, the app will send a push notification to the user's phone, letting them know that the ground is dangerous for their dog, and they should move to a cooler area. If not, then the app will say, "SAFE", and the dog can walk on that ground. The danger threshold of 50° C. is variable and can be different based on the owner's observation of when the paws of their dog would burn. Users will be able to set the danger threshold to any temperature of their liking, but the application will provide a warning to the user if they set it to a temperature that may be too high or too low. As for the other features of the app, it contains standard pages such as a login/sign-up page, a homepage, a page to manage your account, and a page to manage the connection to the device. Another feature of the app is the community map, which will display an interactive GPS®-style map of the area surrounding the user. Hotspots, or areas where the ground temperature has been recorded as dangerous by other users, will be denoted on the map. This data will be taken from the temperature recordings from other devices within the last two hours to ensure the recency of the map information. This way, people who have other users of the invention in their community will know which areas are safe or dangerous to walk their dog in, enabling prior planning of their intended route. Additionally, the app can continuously track the user's GPS® location and send a push notification if they are nearing a hotspot, alerting them in advance and allowing them to reap the benefits of the map without actively looking at it.

I. Testing and Error Correction

Since the infrared temperature sensor is always operating from a distance and it is very compact, it has an inherent inconsistency and does not always read temperature accurately. To test the overall accuracy and determine whether or not error was consistent, we held the device over a surface with a known and controlled ground temperature and measured the deviation of the sensor's output from the known value. This test showed us that the sensor was mostly accurate, but at greater heights, it exhibited a predictable amount of error. We took the data from this experiment and created a correction algorithm that accounts for the height-induced error to produce a more accurate measurement. To implement the algorithm, once a connection is established between the device and the user's mobile phone, the application asks them to enter their pet's neck height.

J. Expanded Options

The invention can exist with many other variations and other features, all of which serve the primary purpose of actively recording ground temperature to protect the paws of dogs. Some features that can be varied include the color, size, and materials that make up the device. Currently, the case is 3-D printed out of black nylon, but this can be altered to a different form of plastic, carbon fiber, or even metal, with any color. Additionally, the specific models of the microcontroller, infrared sensor, battery, on/off switch, charging port breakout board, and wires can be changed, so long as the current functionality is retained. As for the features that exist on the apparatus, one variation that can be added is an onboard user alert system, such as a speaker or LED light on the device itself that turns on if the ground temperature is too high. This does not entail much extra cost for the device itself and aids the purpose of alerting the pet owner. A further variation is the clamping system that is used to attach the device to the dog's collar. As long as the device is securely connected to the collar and oriented properly, it does not matter what sort of clamp system is used. This can also be extended to pet harnesses and vests, rather than strictly traditional collars. A further variation is with the method of communication between the microcontroller and the user's phone, which does not have to be specifically Bluetooth® and could use Wi-Fi® or any other system that is sufficient.

Having described the present invention including various features and variations thereof, it is intended that the appended claims be interpreted as including the embodiments described herein, the alternatives mentioned above, and all equivalents thereto.

CONCLUSION

In conclusion, the device tackles pet safety by providing an alternate approach for pet owners concerned about their pet's safety. It uses infrared temperature sensing technology to accurately and consistently read the ground temperature from a distance while offering a safe and streamlined experience, and by integrating with a companion app, it not only alerts owners if the ground is too hot for their pet's paws but also provides valuable data on the nearby area. Its user-friendly design makes it accessible to a wide range of users, making it an ideal choice for pet owners seeking a convenient and effective solution to protect their furry friends from hot surfaces.

What is claimed is:

1. An animal protection apparatus, attachable to an animal's body, for protecting feet of an animal, the apparatus comprising:

a main housing containing:
    a temperature sensor to detect a temperature of the ground on which the animal is on;
    a controller to generate a warning signal based on the temperature of the ground detected by the temperature sensor; and
    a power supply for supplying power to the temperature sensor and the controller; and
an attachment system for removably attaching the main housing to a gear worn by the animal;
the main housing further comprising a protective box enclosed within the main house,
the temperature sensor, the power supply and the controller being contained within the protective box; and
the protective box further comprising a sensor channel, which is a cylindrical recession where the temperature sensor is housed and recessed within the protective box.

2. The apparatus of claim 1, wherein the temperature sensor is configured to consistently point towards the ground, when the apparatus is attached to the gear worn by the animal through the attachment system, for detecting the temperature of the ground regardless of a posture of the animal.

3. The apparatus of claim 1, wherein the temperature sensor is an infrared (IR) sensor capable of emitting and receiving infrared radiation to detect a temperature of an object.

4. The apparatus of claim 1, wherein the attachment system of the apparatus further comprises:

a clamp that is removably attachable to the gear worn by the animal; and
an attachment component, comprising a first end and a second end, wherein
said first end is configured to be attachable to the clamp and slidable with respect to the clamp; and
said second end is connectable to the main house so that the main housing is able to pivot with respect the animal's body when the apparatus is attached thereto.

5. The apparatus of claim 4, wherein the clamp comprises a front piece and a back piece, and the clamp is removably attachable to the gear worn by the animal by screwing the front piece and the back piece together.

6. The apparatus of claim 4, wherein the first end of the attachment component is a slot piece, which is configured to slide and fit within a sliding channel located on the front piece of the clamp.

7. The apparatus of claim 6, wherein the slot piece is equipped with one or more magnets to secure the attachment component to the clamp through a magnetic force.

8. The apparatus of claim 4, wherein the second end of the attachment component is a cylinder, which is configured to slide into and be rotatably connected to a cylinder channel protruding from the main house.

9. The apparatus of claim 1, wherein the power supply is a rechargeable battery, with a charging port and a power switch being connected to the rechargeable battery, the charging port and the power switch being accessible externally from the main housing, through openings of the main housing.

10. The apparatus of claim 1, wherein the apparatus further comprises a communication interface for establishing a connection between the apparatus with an external device, and outputting the generated warning signal to the external device.

11. The apparatus of claim 1, wherein the apparatus further comprises a communication interface for establishing a connection between the apparatus and an external device via a short range communication protocol.

12. The apparatus of claim 1, wherein the apparatus further comprises a location detector for detecting a location of the animal, the detected location being transmitted to an external device via a communication interface.

13. An animal protection apparatus, attachable to an animal's body via an attachment system, for protecting feet of an animal, the apparatus comprising:

a housing;

a temperature sensor, contained in the housing, for detecting a temperature of ground on which the animal is on;

a processor and a memory, coupled to the processor, storing instructions that cause the processor to perform the operations of:

detecting the temperature of ground, by the temperature sensor, at a predetermined time interval;

receiving an output of the temperature sensor to identify the temperature of the ground;

comparing the identified temperature of the ground with a predetermined temperature threshold;

generating a warning signal if the temperature of the ground is greater than the predetermined temperature threshold; and outputting the generated warning signal.

14. The apparatus of claim 13, wherein the predetermined time interval is fifteen seconds.

15. The apparatus of claim 13, wherein the predetermined temperature threshold is 50° C.

16. The apparatus of claim 13, wherein the memory further stores instructions to cause the at least one processor to perform a calibration process for calibrating the temperature sensor, the calibration process comprising:

positioning the apparatus on a surface with a known and controlled ground temperature;

detecting, by the temperature sensor, a temperature of the ground from the surface on which the apparatus is positioned;

comparing the difference between the known and controlled ground temperature with the temperature detected by the temperature sensor; and adjusting output of the temperature sensor based on the comparison.

17. The apparatus of claim 13, wherein the memory further stores instructions to cause the at least one processor to output the generated warning signal to a user by playing a sound or by illuminating an LED (Light Emitting Diode) light.

18. The apparatus of claim 13, wherein the memory further stores instructions to cause the at least one processor to transmit the detected temperature to a server, in order to create a GPS (Global Positioning System) heatmap that shows dangerous areas in the heatmap.

* * * * *